United States Patent [19]

Park

[11] Patent Number: 4,954,890
[45] Date of Patent: Sep. 4, 1990

[54] DRIVING METHOD FOR 3-D HIGH LUMINANCE LCD PROJECTOR

[75] Inventor: Hong C. Park, Seoul, Rep. of Korea

[73] Assignee: Goldstar Co., Ltd., Rep. of Korea

[21] Appl. No.: 263,639

[22] Filed: Oct. 27, 1988

[30] Foreign Application Priority Data

Oct. 31, 1987 [KR] Rep. of Korea ............... 1987/12246

[51] Int. Cl.$^5$ ............................................. H04N 15/00
[52] U.S. Cl. ......................................... 358/88; 358/3; 358/92
[58] Field of Search .......................... 353/7, 8, 9, 122; 350/132; 358/88, 92, 91, 3

[56] References Cited

U.S. PATENT DOCUMENTS

| | | | |
|---|---|---|---|
| 2,883,906 | 4/1959 | Rehorn | 358/88 |
| 4,562,463 | 12/1985 | Lipton | 358/92 |
| 4,641,178 | 2/1987 | Street | 358/3 |
| 4,647,966 | 3/1987 | Phillips et al. | 358/92 |
| 4,654,699 | 3/1987 | Medina | 358/92 |
| 4,772,944 | 9/1988 | Yoshimura | 358/88 |

Primary Examiner—Howard W. Britton
Assistant Examiner—Kim Yen Vu
Attorney, Agent, or Firm—Anthony J. Casella; Gerald E. Hespos

[57] ABSTRACT

Present invention employs two separate optical systems for left and right view images to be separately projected onto a screen for display by meams of respective light sources in the way of beaming a left view present image on the right view past image just prior displayed, and vice versa, to effect 3-D image and upgrade the brightness of the picture in display.

11 Claims, 2 Drawing Sheets

DRIVING METHOD FOR 3-D HIGH LUMINANCE LCD PROJECTOR

SUMMARY OF THE INVENTION

Present invention relates to a three-dimensional TV (3-D TV) system of a liquid crystal display (LCD) projector, in particular, a driving method for a high luminance 3-D projector which gives 3-D images, generally perceived dark through polarized glasses, in clear brightness for a number of viewers to simultaneously see the images.

In the conventional art, a 3-D TV system comprises, as in FIG. 1, a cathode ray tube (CRT), a signal source containing 3-D images, a shutting controller, left and right liquid crystal (LC) windows. The system employs the method that films left and right views separately so as to be respectively seen through the corresponding eyes only in the manner of a separate view for each eye.

When the image signal for the view taken by a left camera is displayed on CRT, the controller receiving signal from the source shuts the right LC window and allows only the left eye to see the left view image, and vice versa for the right eye.

In the conventional 3-D TV, however, the brightness of image depends on the beam given onto CRT from the light source such that 3-D images are generally perceived dark to necessitate the use of polarized glasses, thus limiting the viewer only to persons with shutter glasses connecting to and operating in synchrony with TV.

The present invention therefore employs left and right optical systems that are placed before respective CRTs to focus the light from the light sources and enhance the luminance of light.

Figure 1:
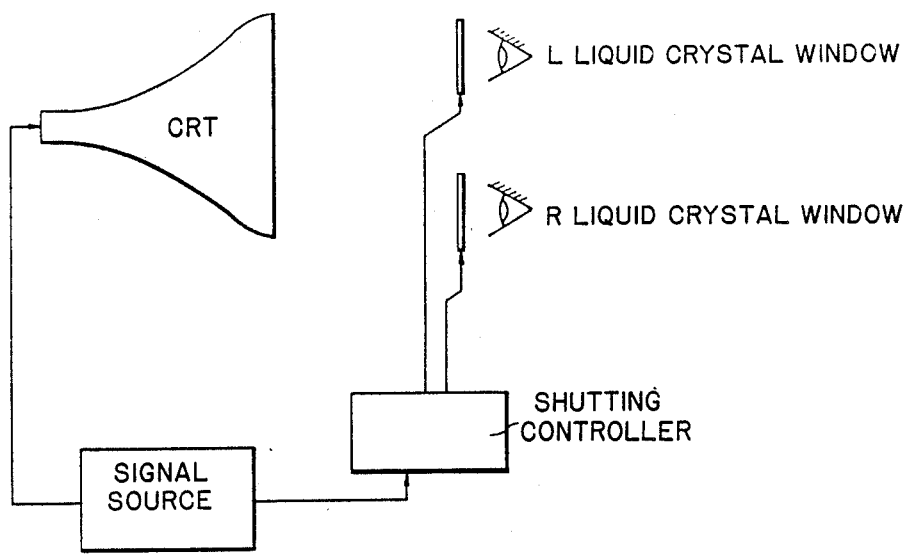
FIG. 1 shows the structure of the conventional 3-D TV system.
Figure 2:
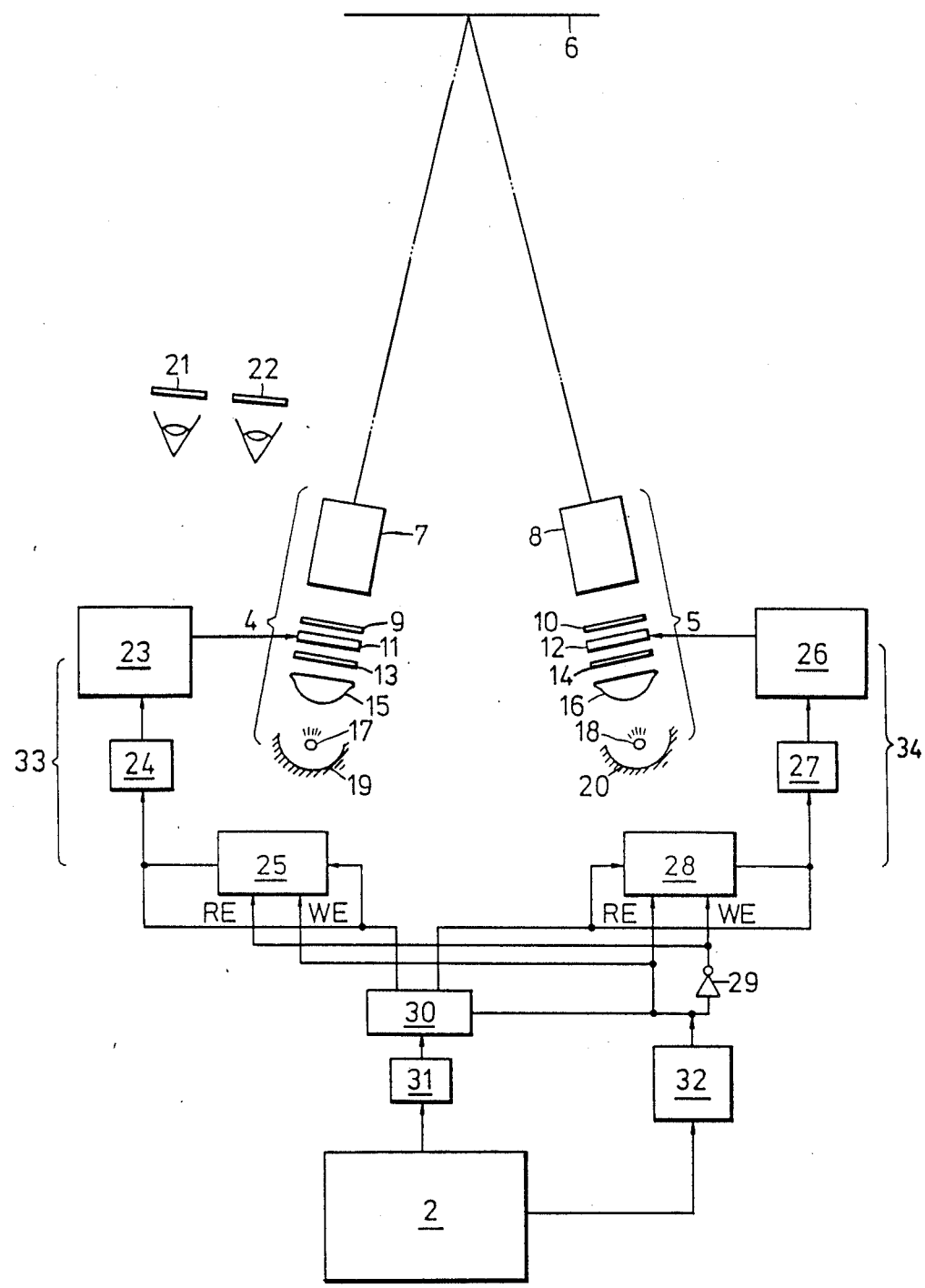
FIG. 2 shows the structure of a 3-D LCD projector of the invention.

Principal parts with numeral codes in the drawings are as in the following: 17 and 18 light sources, 25 a CCD, and 24 and 27 D/A converters, 33 indicating the left view image system, 34 the right image system. In reference to the drawings the invention is described in details.

DETAILED DESCRIPTION OF THE INVENTION

According to the invention, a preferred embodiment includes left and right optical system for scanning light beam onto a screen 6; the left optical system 33 comprising a left lens 7, a S polarizer 9, a left LCD panel 11, a polarizer 13, a condenser lens 15, a light source 17 and a mirror 19 and the right optical system 34 comprising a right lens 8, a P polarizer 10, a right LCD panel 12, a polarizer 14, a condenser lens 16, a light source 18 and a mirror 20.

With regard to the left and right optical systems, the output of signal source 2 connects via A/D converter 31 with demultiplexer 30, one of whose output terminals connects with left optical system 33 via CCD (charge coupled device) 25 and LCD driving circuit 23 while another connects with right optical system 34 via CCD 28, D/A converter 27 and LCD driving circuit 26. Another output terminal of the signal source 2 connects to left and right signal identifier 32, whose output connects to demultiplexer 30, RE (READ ENABLE) of CCD 28 and WE (WRITE ENABLE) of CCD 25 for the left image system 33 and also via NOT gate 29 to WE of CCD 28 and RE of CCD 25 for the right image system 34.

The left and right images formed on LCD panels 11, 12 are respectively S serial or P parallel polarized through S-polarizer 9 and polarizer 13 or P-polarizer 10 and polarizer 14 to combine into a 3-D image on the screen 6 in the state of S-polarization or P-polarization. The combined image is viewed through polarized glasses 21, 22 to give each eye the respective left or right view of a scene and create a 3-D effect as on binocular vision.

However, the signal source 2 gives for a field the left and right images each for one of both eyes of a viewer such that the given image is perceived dark by the viewer. To enhance luminance, therefore, a right image (which is the image given just prior to the present left image) is arranged to again appear with the left image for display.

For the elimination of flickering, there are also provided D/A converters 24, 27; CCDs 25, 28; NOT gate 29; demultiplexer 30; A/D converter 31; left and right signal identifier 32.

Referring to the drawings, the operation of the invention shall be described in details.

With a left view image given at a time the signal identifier 32 reads out the image signal as that of the left view and outputs a control signal "", which performs the following operation.

First, the signal gives an input of "1" to address of demultiplexer 30 that then gives the A/D converter image signal to D/A converter 24. Second, CCD 25 of SPS serial-parallel-serial structure connecting to the signal line of D/A converter 24 activates WE (WRITE ENABLE) to record a left video. Third, SPS CCD 28 connecting to the signal line of the right side D/A converter 27 activates RE (READ ENABLE) to give the right image earlier memorized.

Thereupon, the left view image system 33 gives a present left image, while the right image system 34 simultaneously gives the right image signal just prior displayed, onto the screen. These left and right operations are alternately performed that the both image systems always display left and right images together to effect the displaying of a whole 3-D image with the total watt of the two light sources 17 and 18 and upgrade the brightness.

On the other hand, the D/A converters 24, 27 in the image systems convert digitalized image signals back into analog signals for the LCD driving circuits to drive respective LCDs.

As described above, the present invention displays the left and right view images separately beamed onto a screen by means of respective light sources in the way of beaming a left view present image together with the right view image just prior displayed and recorded and vice versa, such that any number of viewers with polarized glasses can view the picture in 3-D image. The two light sources also provide bright pictures for the viewers.

What is claimed is:

1. In a 3-D image system employing a signal source for sequentially generating signals and alternately directing the sequentially generated signals to left and right image systems respectively, said image systems comprising left and right LCD projectors respectively for projecting images corresponding to the signals received onto a screen, a driving method for achieving high luminance 3-D with said projectors, said method comprising the steps of: projecting an image corresponding to a generated signal received by a selected one of the left and right image systems; memorizing the signal received by the selected image system; projecting by the other of said left and right image systems an image corresponding to the next sequentially generated signal and simultaneously projecting by the previously selected image system an image corresponding to the memorized signal such that one of the left and right image systems gives a present image signal, while the other of the left and right image systems gives again the memorized image just prior displayed, onto the screen by means of two respective light sources to upgrade the luminance of the 3-D image on the screen.

2. Method as claimed in claim 1, in that SPS CCDs 25, 28 records the image signal of a field while giving an output of the prior recorded image signal of another field.

3. A system for displaying/observing three-dimensional images including two image systems, where during production of a view of a momentary image by one image system the other image system produces a view of an immediately preceding image, the image systems defining LCD projectors having different polarization and directing their light beams onto a single screen.

4. The system of claim 3, wherein each LCD projector comprises a light source and a liquid crystal plate sandwiched between two polarizers.

5. The system of claim 4, wherein one LCD projector emits S-polarized light and the other LCD projector emits P-polarized light.

6. The system of claim 5, wherein each image system includes means for storing an image signal corresponding to a present view upon receipt by the respective image system until projection of a stored image signal by the other image system.

7. The system of claim 6, wherein there is provided an image signal source alternatingly emitting image signals of a left view to a left one of the image systems and of a right view to a right one of the image systems.

8. The system of claim 7, wherein there is provided a switching means for alternatingly connecting the image signal source with the left or right image system respectively.

9. The system of claim 8, wherein the storing means are activated in synchronism with the change of the image signals from the image signal source for a writing and reading, respectively, the activation being caused by the switching means.

10. The system of claim 9, wherein the image signal source is connected to a demultiplexer switched over by the switching means in synchronism with the change of image signals and applying the respective image signal to the associated image system.

11. The system of claim 3, further comprising polarization glasses, and wherein a combined image produced by the left and right image systems is observable by the polarization glasses.

* * * * *